United States Patent [19]

Busch

[11] Patent Number: 4,494,872

[45] Date of Patent: Jan. 22, 1985

[54] MULTIPLE ENTRANCE APERTURE DISPERSIVE OPTICAL SPECTROMETER

[75] Inventor: Kenneth W. Busch, Waco, Tex.

[73] Assignee: Baylor University, Waco, Tex.

[21] Appl. No.: 361,264

[22] Filed: Mar. 24, 1982

Related U.S. Application Data

[63] Continuation-in-part of Ser. No. 195,210, Oct. 17, 1980, Pat. No. 4,375,919, which is a continuation of Ser. No. 33,235, Apr. 25, 1979, abandoned.

[51] Int. Cl.³ .............................................. G01J 3/20
[52] U.S. Cl. ..................................................... 356/328
[58] Field of Search ............... 356/310, 326, 328, 331, 356/334; 350/168

[56] References Cited

U.S. PATENT DOCUMENTS

| | | | |
|---|---|---|---|
| 2,823,577 | 2/1958 | Machler. | |
| 3,519,816 | 7/1970 | Bartz et al. | 356/51 |
| 3,554,649 | 1/1971 | Ridgway | 356/334 |
| 3,837,744 | 9/1974 | Egan et al. | 356/310 |
| 4,022,531 | 5/1977 | Orazio et al. | 356/332 |
| 4,259,014 | 3/1981 | Talmi | 356/328 |

OTHER PUBLICATIONS

"The Role of Image Devices in Simultaneous Multielement Analysis" K. W. Busch, B. Malloy, 1979 American Chemical Society.

"Multiple Entrance Slit Vidicon Spectrometer for Simultaneous Multielement Analysis" K. W. Busch. B. Malloy, Analytical Chemistry, vol. 51, 1979.

"The Design of a Portable Polychromator to Monitor Contaminants in Tungsten Arc-Inert Gas Shields" W. A. Loseke, E. L. Grove, E. S. Gordon, Applied Spectroscopy, vol. 25, No. 1, 1971.

"An Optical Multichannel Detection System for Modulation Spectroscopy" J. H. Meyling, W. H. Hesselink, Journal of Physics, vol. 10, No. 5, 1977.

Primary Examiner—F. L. Evans
Attorney, Agent, or Firm—Kenway & Jenney

[57] ABSTRACT

A dispersive optical spectrometer is disclosed which comprises light detection means, dispersion means for separating light radiation into spectral components and for directing the spectral components toward the light detection means, means for admitting light radiation into the entrance focal plane and for directing the light radiation toward the dispersion means, the light radiation admitting means including a plurality of spaced-apart apertures, and light transmission means for transmitting light radiation from a light source to one or more of the apertures. In a preferred embodiment, the apertures form a two-dimensional, rectilinear array for producing non-overlapping spectra.

35 Claims, 11 Drawing Figures

MULTIPLE ENTRANCE APERTURE DISPERSIVE OPTICAL SPECTROMETER

BACKGROUND OF THE INVENTION

This is a continuation-in-part of Ser. No. 195,210 filed Oct. 17, 1980, now U.S. Pat. No. 4,375,919 which is a continuation of Ser. No. 33,235 filed Apr. 25, 1979, both entitled "Multiple Entrance Aperture Dispersive Optical Spectrometer."

The present invention relates to spectrometer apparatus for separating light radiation into a plurality of spectral bands and, more particularly, to a dispersive optical spectrometer or polychromator for efficiently dispersing spectral radiation for performing multielement spectral analysis.

Optical spectrometers have been known for quite some time. These devices are based on a dispersive element, which may be a prism or a diffraction grating, such as a plane or concave diffraction grating. A typical conventional optical arrangement, such as an Ebert or Czerny-Turner mounting, is comprised of the following components: (1) a single entrance aperture to admit radiation, (2) a collimating component to render the admitted radiation into a parallel bundle of rays, (3) a dispersion device such as a prism or diffraction grating, (4) a focusing component to focus the dispersed radiation as images along the plane known as the focal plane, and (5) detection means upon which the dispersed spectrum is focused and which in some manner transduces the optical information striking it into some usable form. In systems which employ a concave diffraction grating, the collimating and focusing components are unnecessary.

Various types of detectors may be used, such as, for example, film, photodiode circuits or optoelectronic multichannel vidicon detectors. One such vidicon may be an optical multichannel analyzer (OMA) coupled with a silicon intensified target (SIT) detector described in catalog number T388-15M-5/78-CP published by Princeton Applied Research Corp., Princeton, N.J.

These dispersive optical spectrometers employ a single entrance aperture so that the spectral information is dispersed in the exit focal plane as a single band of radiation along a single direction of dispersion, for example a single horizontal band of radiation. With this arrangement, the position of the various radiational components along the focal plane defines the wavelength of the various radiational components which may be present.

This optical arrangement is perfectly satisfactory for use with photographic detection because the photographic plates may be fabricated in lengths sufficient to cover the spectral region of interest, from the ultraviolet to the near infrared. The advent of optoelectronic detectors, such as the vidicon and other electronic image detectors, has demonstrated that these devices offer some distinct advantages for the spatial detection of dispersed radiation. Their major limitation at present seems to be the limited amount of dispersed spectral information which can be simultaneously imaged on the image or light detector. When such detectors are used with a conventional dispersive spectrometer as described above, only a limited spectral region can be accessed by the image detector simultaneously. This limited spectral region, or window, is defined by:

$$W = R_d D \tag{1}$$

where W is the extent of spectral region or the window width, $R_d$ is the reciprocal linear dispersion of the spectrometer and D is the diameter of the light sensitive face plate of the image tube. Thus the window width may be increased by either increasing $R_d$ or D. Because of the nature of the image detectors, the prospect for increasing D is remote. If $R_d$ is increased, by changing the focal length of the collimator/focusing elements or by employing a more coarsely ruled diffraction grating, more spectral information may be compressed across the face plate of the image detector. However, this modification results in poorer resolution.

The resolution of the system determines how closely two spectral components may be and still be recognized as separate, distinct spectral components. Thus, the use of an image detector with a conventional single aperture dispersive spectrometer results in a compromise between window width and resolution. For atomic spectroscopy one should ideally cover the entire spectral region of interest from the ultraviolet to the near infrared at high resolution to cover the maximum spectral region under conditions where as many as possible of these spectral components are recognizable as distinct, separate spectral components which do not overlap adjacent spectral components.

To overcome this limitation of conventional one-dimensional dispersive systems, an optical arrangement known as an echelle system has been employed in conjunction with image detectors. Such systems use a specially, more coarsely ruled grating, known as an echelle grating, in order to provide high dispersion. In addition to the echelle grating, another dispersing device such as a prism is arranged to disperse the radiation orthogonal to the direction of dispersion of the echelle grating. Such a crossed dispersion optical arrangement results in a two-dimensional array of spectral information because the prism disperses all the various diffraction orders produced by the echelle grating. This system, however, employs complex optics and does not display the spectrum in parallel bands. Furthermore, the bands are nonuniform in size which makes detection difficult and inefficient since large portions of the target are not utilized. Also, separation between parallel bands is not uniform. Resolution also varies across the spectrum in this type of system. In order to utilize the optoelectronic detector apparatus, the nonparallel display of bands calls for a complex computer controlled detector system and constitutes an inherently inefficient use of the two-dimensional vidicon target. This system also is notorious for its high stray light levels, a direct result of the optical design and configuration.

SUMMARY OF THE INVENTION

It is, accordingly, an objective of this invention to provide an apparatus for separating light radiation into its component spectral bands in such a way that the dispersed radiational components may be more efficiently arranged and focused on an image detector than has heretofore been accomplished with conventional one-dimensional dispersive optical spectrometers.

It is another objective of this invention to provide an apparatus for separating light radiation into its component spectral bands which has greater operational flexibility to permit various adjustments tailored to the particular analysis being performed in order to obtain more accurate information.

Additional objectives and advantages of the invention will be set forth in part in the description which follows, and in part will be apparent from the description, or may be learned by practice of the invention. The objectives and advantages of the invention may be realized and attained by means of the instrumentalities and combinations particularly pointed out in the appended claims.

To achieve the foregoing objectives, and in accordance with the purpose of the invention, as embodied and broadly described herein, there is provided a dispersive optical spectrometer comprising radiation detection means, dispersion means for separating radiation into spectral components and for directing the spectral components toward the detection means, means for admitting radiation into an entrance focal plane and for directing the radiation toward the dispersion means, the radiation admitting means including a plurality of spaced apart apertures, and transmission means for transmitting radiation from a radiation source to one or more of the apertures.

Further, the plurality of apertures of the light radiation admitting means may be spaced apart in a direction parallel to the direction of dispersion of the dispersion means. The dispersive optical spectrometer may also include means for rendering selected ones of the apertures opaque; or means for varying the size of at least one of the apertures or filter means optically operative with the light transmission means to modify the effect of at least a portion of the light radiation or any combination of these means. It is also contemplated that the light transmission means may comprise at least one fiber optic light guide.

In addition, the spectrometer or polychromator may include an entrance focal plane comprising an array of entrance apertures, each of the aperture locations in the array being defined by column and row coordinates of a fixed rectilinear matrix located in the entrance focal plane, the column and row coordinates being separated by predetermined distances. In this embodiment, the optical fibers which direct radiation into the polychromator are retained at locations of the array so that no two of the fibers are aligned with the same row or column coordinate, whereby radiation admitted by the fibers is displayed at the exit plane in non-overlapping spectral bands.

Further, this optical fiber polychromator may comprise apparatus included in the entrance plane for slidably retaining the ends of the fibers for movement parallel to the entrance focal plane so that the fibers can be moved to different locations in the array to adjust the positions of the parallel spectral bands on the two dimensional display such as a vidicon.

BRIEF DESCRIPTION OF THE DRAWINGS

The accompanying drawings, which are incorporated in and constitute a part of the specification, illustrate embodiments of the invention and, together with the description, serve to explain the principles of the invention.

In the Drawing

FIG. 11 is a schematic diagram showing a further preferred embodiment of the multi-slit entrance plate including a slot diagonally disposed across the entrance focal plane for slidably guiding a plurality of optical fibers for movement to different points in the entrance focal plane.

DETAILED DESCRIPTION OF PREFERRED EMBODIMENTS

Reference will now be made in detail to preferred embodiments of the invention, which are illustrated in the accompanying drawings.

Figure 1:
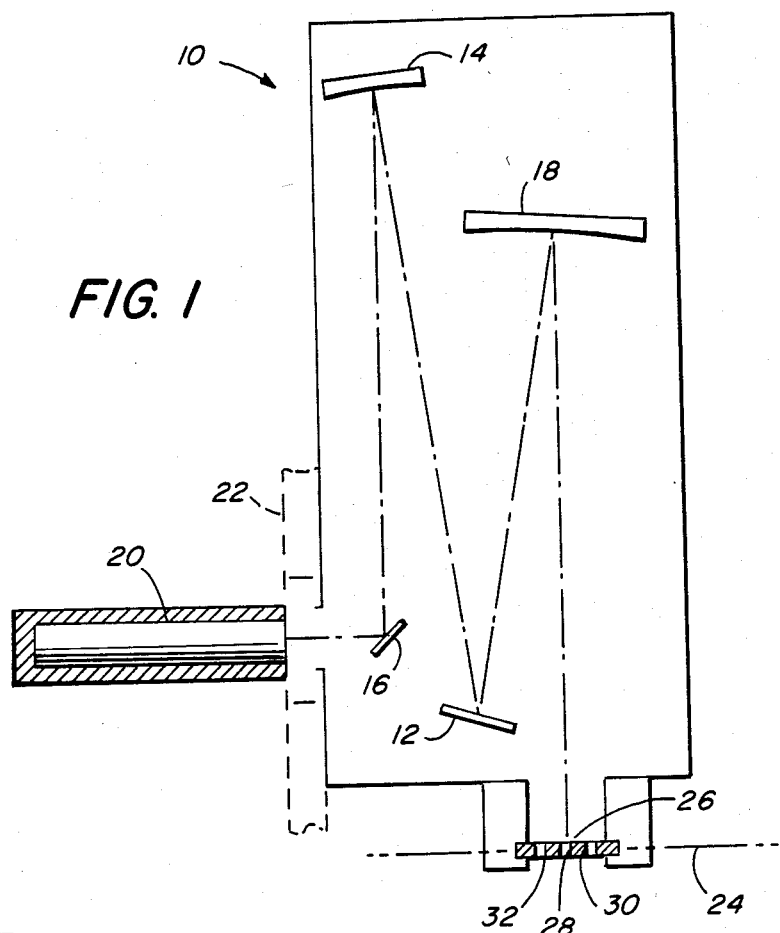
FIG. 1 is a plan view of one embodiment of a dispersive optical spectrometer constructed in accordance with the teachings of this invention.

Referring to the drawings, and more particularly to FIG. 1, there is illustrated a dispersive optical spectrometer 10 formed in accordance with this invention. The spectrometer 10 includes conventional optical elements including dispersion means, such as a diffraction grating 12, means for directing the spectral components emanating from the diffraction grating 12, such as a focusing mirror 14, a direction mirror 16 and means, such as mirror 18, for collimating and directing admitted light radiation toward the diffraction grating 12.

Light detection means 20 is mounted in the spectrometer exit focal plane 22. The light detection means can be any image or array detector such as photosensitive film, a photodiode circuit, a rear illuminated screen or the target of an optoelectronic detector coupled to an optical multichannel analyzer. The latter may be, for example, of the type previously noted as described in Princeton Applied Research Corporation catalog number T388-15-M-5/78-CP. The analyzer is connected to a display device such as an oscilloscope which provides a visual readout in the form of, for example, a display of radiation intensity vs. wavelength, to enable multielement analysis.

In accordance with this invention, there is also provided means for admitting light radiation to the entrance focal plane 24 and for directing the light radiation toward the dispersion means. As embodied herein the means 26 for admitting light radiation into the entrance focal plane 24 includes a plurality of spaced apart apertures 28 which can be formed in a multiple entrance aperture assembly 30 mounted in the entrance port 32 of the optical spectrometer 10.

Figure 2:
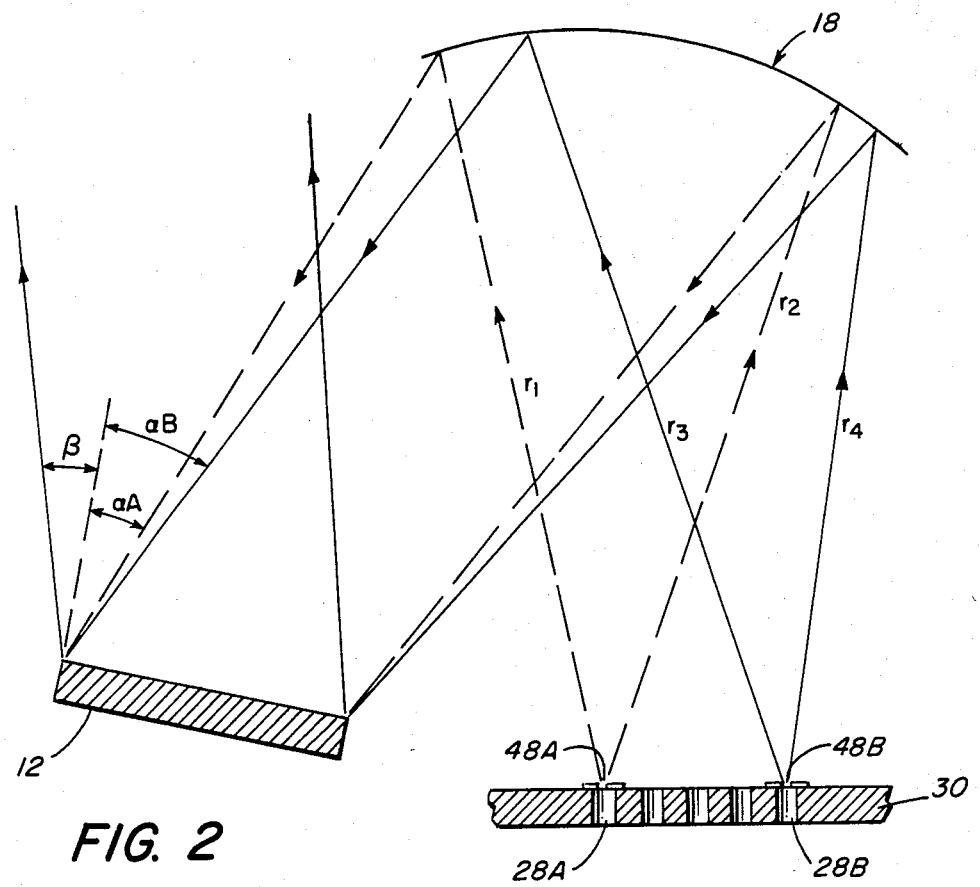
FIG. 2 is a schematic illustration of the path of light radiation from the multiple entrance aperture assembly to the dispersion means.

The use of a series of multiple entrance apertures 28 is capable of providing composite wide band spectrum information. Each entrance aperture 28 will admit light independently of the others and each will independently satisfy the well-known grating equation $$m\lambda = d(\sin \alpha \pm \sin \beta) \quad (2)$$

where m is the diffraction order, $\lambda$ is the wavelength of dispersed radiation, d is the grating spacing, $\alpha$ is the angle of incidence measured with respect to the grating normal and $\beta$ is the angle of diffraction with respect to the grating normal. The angle $\beta$ determines the position of focus for a given spectral component of wavelength $\lambda$ for a given angle of incidence $\alpha$ in the first order. When multiple entrance apertures are employed, it is clear from the above equation that for a given angle $\beta$ each entrance aperture will independently satisfy the equation. Since each aperture occurs at a different position in the entrance focal plane 24, the corresponding radiation from each aperture will have a different angle of incidence $\alpha$ with the grating 12 as is shown in FIG. 2. The grating 12 of course separates the incident radiation into spectral components or bands and the focusing mirror 14 focuses the spectral band covering a defined spectral window onto the light detection means 20.

Thus, each entrance aperture 28 will independently focus its own spectrum onto the light sensitive portion or target of the light detection means 20 and each spectrum will be displaced from the others in accordance with the above equation (2) by the displacement of the entrance apertures in the entrance focal plane 24. When the multiple entrance apertures are arranged in a direction parallel to the direction of dispersion of the dispersion means or grating 12, such as horizontally, and when several apertures are employed simultaneously, a series of overlapping spectra are imaged on the light sensitive surface of the light detection means 20. With this arrangement, the resolution achievable depends upon the grating characteristics and the resolution (modulation transfer function) of the light detection means, but not on the displacement between adjacent entrance apertures 28. In this way, the resolution achieved is not limited by how closely the adjacent entrance apertures may be placed with respect to one another.

Figure 3:
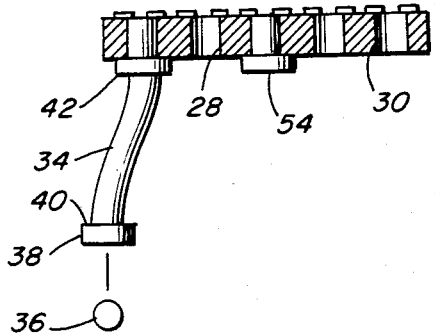
FIG. 3 is a schematic plan view of the multiple entrance aperture assembly of FIG. 2 and further illustrating a light source and light transmission means.

Further, in accordance with the invention, and as shown in FIG. 3, light transmission means 34 are provided to transmit light radiation from a light source 36 to one or more of the apertures 28. Due to the optical difficulties presented when illuminating multiple entrance apertures simultaneously from a single source, fiber optic light guides 34 satisfactorily convey the light radiation from the light source 36 to the individual apertures 28. While the use of fiber optic light guides is convenient, their use is not essential to the multiple aperture concept as other optical arrangements, which could accomplish this light transmission, are possible.

In order to improve the light gathering ability of each fiber optic light guide 34, a light-collecting (input) lens 38 can be fitted onto the input end 40 of each light guide 34. The use of fiber optic light guides also permits greater flexibility of use and tailoring of the spectrometer 10 to the particular needs at the moment. For example, the use of individual fiber optic light guides permits individual adjustment to examine major, minor and trace elements in the multielement specimen being examined. Intense emission radiation striking the detection means 20 may be attenuated or avoided through the use of variable neutral density filters or narrow band pass filters 42 which may be employed with a particular fiber optic guide 34 without simultaneously attenuating the intensities for all elements.

Figure 4:
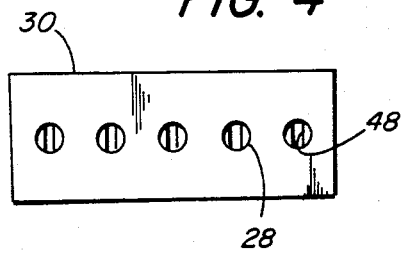
FIG. 4 is a schematic front view of a multiple entrance aperture assembly for admitting light radiation to the optical spectrometer of FIG. 1.
Figure 5:
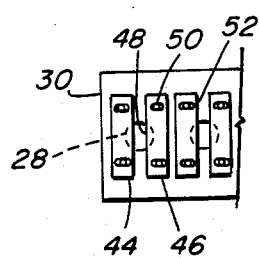
FIG. 5 is a schematic rear view of the multiple entrance aperture assembly of FIG. 4.

Further, in accordance with the invention, the multiple entrance aperture assembly 30 may also include means for varying the size of the apertures 28. As here embodied, and as shown in FIGS. 4 and 5, the apertures may be masked from behind the aperture assembly 30 by a light shutter formed of a pair of plates 44,46 which together form an entrance slit 48 of the desired width. While the width dimension may vary depending upon the particular spectrometer and the use to which it will be put, it has been found that typically the slit width can be from approximately 10 micrometers to approximately 1 millimeter. The plates 44, 46 may include means for enabling adjustment of the slit width, such as slots 50 which, together with fastening means, for example bolts 52, permit adjustment of the dimensions of the slit 48.

One reason for varying the slit width would be to attenuate or otherwise modify the emission radiation striking the light detection means or to totally render the aperture 28 opaque. In situations where less than all of the apertures are used simultaneously, other means can be utilized to render the apertures opaque, such as opaque plugs 54 which can be selectively inserted in the apertures as shown in FIG. 3.

Figure 6:
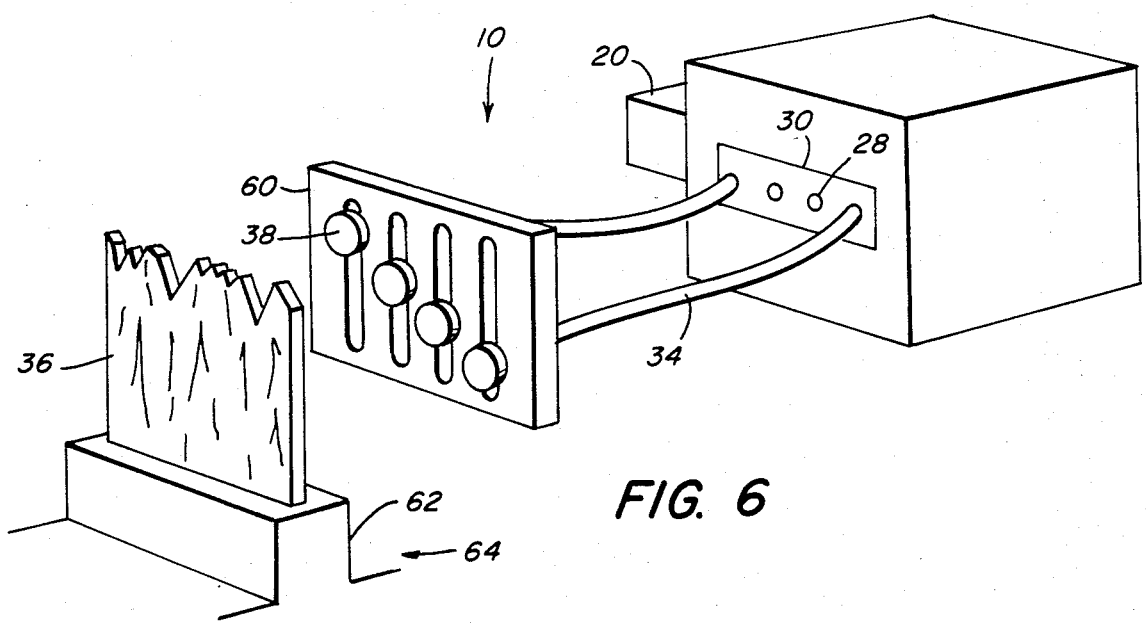
FIG. 6 is a schematic perspective illustration of a dispersive optical spectrometer constructed in accordance with the teachings of this invention.

In one particular illustrative embodiment, as shown in FIG. 6, a plurality of light collecting lenses 38 are mounted on a vertically slotted plate 60 adjacent to the burner head 62 of a flame excitation source 64. The input end of each of the fiber optic light guides 34 is fitted onto a lens 38. The other end, or exit end, of the light guide is adapted to be "plugged," like telephone jacks into a switchboard, into a multiple entrance aperture assembly 30. In one example, the apertures were 1.588 millimeters in diameter spaced on 4 millimeter centers and 27 horizontally aligned apertures were formed across a 12 centimeter entrance port. Each aperture was masked from behind to form an entrance slit 1.6 millimeters high and 100 micrometers wide. The vertical position of the multiple entrance aperture assembly 30 was adjusted to that height which produced a maximum signal at the light detection means 20.

The light detection means utilized consisted of a silicon intensified target (SIT) vidicon detector and an optical multichannel analyzer. The multichannel analyzer accumulated spectral information in 500 electronic channels and had two separate memories that permitted the storage of a data spectrum and a blank spectrum. An arithmetic unit permitted channel by channel subtraction of the memories.

The diffraction grating utilized produced a reciprocal linear dispersion of 3.2 nanometer/millimeter. Each separate entrance slit imaged a 40 nanometer spectral window on the 13 millimeter SIT detector face plate. Since the entrance slits 48 were placed over a 12 centimeter segment of the entrance focal plane, any wavelength within a range of 384 nanometers could be imaged on the detector. By employing several entrance slits simultaneously, widely separated spectral lines of interest were able to be simultaneously imaged on the detector with adequate resolution.

Mounting of the lenses 38 on the vertically slotted plate 60 permitted individual vertical adjustment of the lenses from 3 to 40 millimeters above the burner head 62 of the flame excitation source 64.

In operation of the embodiment illustrated in the drawings, light radiation from a light source 36 is transmitted to the multiple entrance aperture assembly 30 by the light guides 34. One or more light guides 34 are plugged into the appropriate number of apertures 28, the particular apertures used being determined by the particular analysis involved. Those apertures not in use are closed by plugs 54 or other suitable means.

The light radiation admitted to the apertures 28 at the spectrometer entrance focal plane 24 is directed toward the collimating mirror 18 and redirected toward the dispersion means 12 for separation into spectral components. As shown in FIG. 2, and referring to the endmost apertures 28A and 28B, the paths of radiation passing through the aperture slits 48A and 48B respectively are shown by the dotted lines $r_1-r_2$ and dashed lines $r_3-r_4$.

The light radiation impinging on the dispersion means or, in the embodiment illustrated, the diffraction grating 12, is separated into its spectral components in accordance with the angle at which the radiation is incident upon the diffraction grating. It is apparent in FIG. 2 that the radiation passing through slits 48A and 48B interacts with the diffraction grating 12 at different angles of incidence $\alpha_A$ and $\alpha_B$.

The radiation leaving the diffraction grating 12 is focused on the light detector 20 by the focusing mirror 14 and the direction mirror 16. The spectral components included in the radiation focused on the detector 20 from slit 48A will span a different range of wavelengths than the radiation focused on the detector 20 from the slit 48B. Each of the apertures 28 accounts for a particular spectral window.

Use of the fiber optics switchboard system as illustrated in FIG. 6 offers several important advantages for simultaneous multielement analysis by optical spectroscopy. Since a line of any given wavelength may be imaged on the light detection means 20 from any of several entrance slit positions, spectral lines may be moved across the light detection means target in such a way as to avoid potential spectral interferences as well as regions of intense, unwanted background which could result in detector saturation and blooming.

In addition, analytical lines may be selected on the basis of spectrochemical considerations, since any line within a 384 nanometer region may be accessed. Thus, in contrast to earlier one-dimensional systems, primary resonance lines normally used in analytical work may be employed rather than less satisfactory emission lines which happen to fall in a certain restricted wavelength window.

Another important advantage of the switchboard system described herein is that the problems normally associated with the simultaneous determination of major, minor and trace elements in a single sample can be ameliorated. The presence of intense emission from major analyte species which often results in target blooming in conventional single entrance slit systems may be avoided with the multiple entrance aperture approach through the use of filters 42, selection of different apertures 28 as the working apertures, or by varying the size of the entrance slits 48. Thus the dispersive optical spectrometer of this invention offers many of the individual adjustment features of the direct reading spectrometer with the added advantages of compactness, flexibility to monitor different combinations of analytical lines and the ability to monitor background adjacent to a spectral line.

That the input end of the light guides 34 can be moved to different positions relative to the light source to selectively gather particular radiation desired for analysis is an advantage, particularly in that the input to several light guides can be compared. The individual observation height adjustment of each light transmission means is possible thereby reducing the severity of the compromise conditions required for a simultaneous multielement analysis by eliminating observation height as a factor.

In another important embodiment of this invention, the entrance focal plane includes a two-dimensional array of entrance apertures arranged in a rectilinear matrix of columns and rows. As will become clear below, such an arrangement takes advantage of a two-dimensional image detector such as a vidicon by displaying spectral bands in a non-overlapping fashion while still permitting simultaneous multielement spectral analysis.

Figure 7:
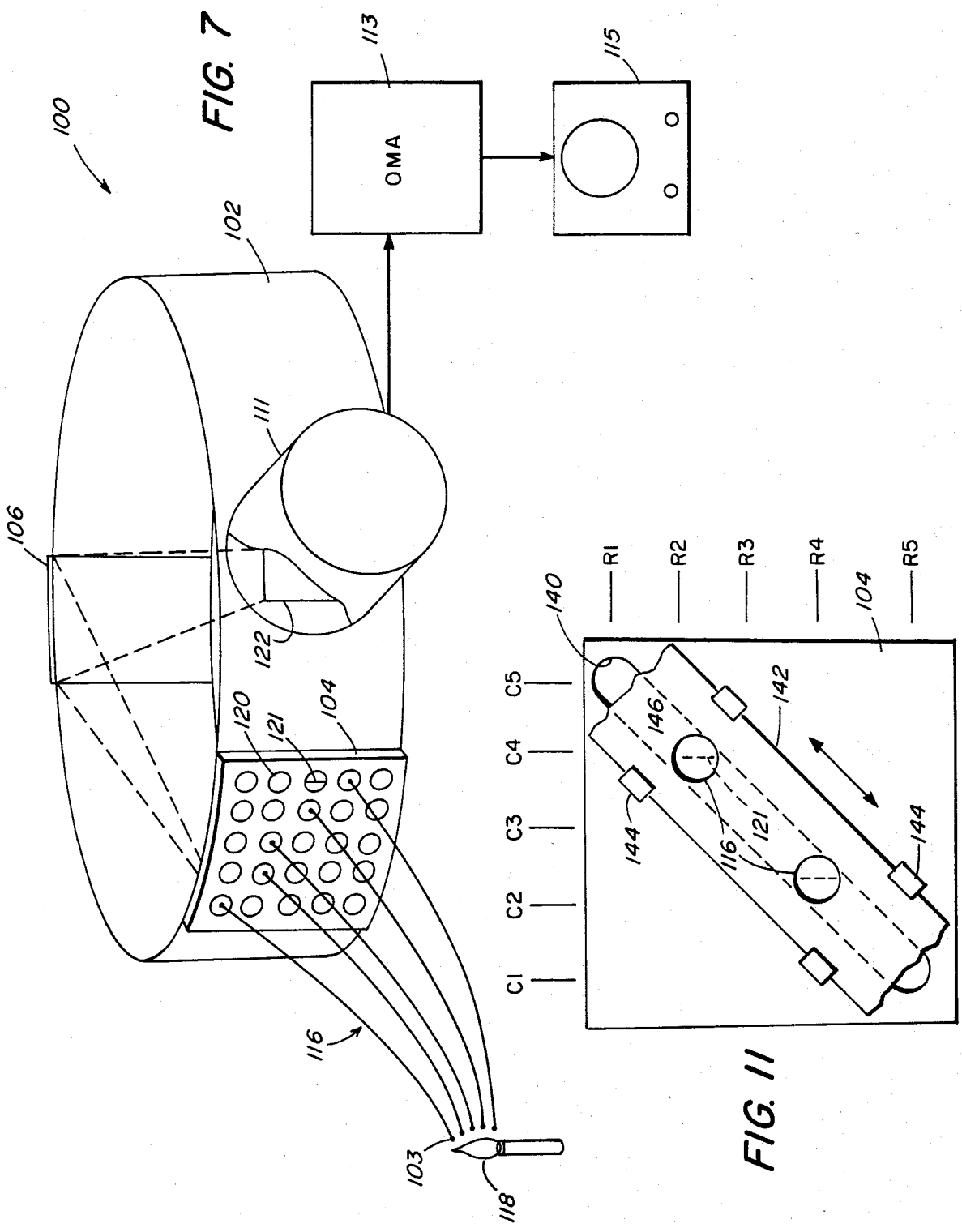
FIG. 7 is a schematic diagram, in perspective, of a preferred embodiment of an optical fiber polychromator constructed in accordance with the teachings of the invention.

Referring to FIG. 7, the spectrometer or polychromator of this embodiment employs a Rowland Circle spectrometer apparatus 100 (see "The Optical Industry and System Directory-Encyclopedia", P.E-281, 1978) including a cylindrical sidewall 102 defining an optical chamber. A multi-slit entrance plate 104 defining an entrance focal plane, a diffraction grating 106, and a detector element 122 defining an exit focal plane are supported on the sidewall 102 to provide a dispersive optical path between the entrance plane and exit plane. Detector element 122 may comprise the target of an optoelectronic detector 111 which is coupled to an optical multi-channel analyzer (OMA) 113. The latter may be, for example, of the type previously noted as described in Princeton Applied Research Corp. Catalog No. T388-15M-5/78-CP.

A plurality of optical fibers 116 are provided to guide light radiation from a source 118 to the multi-slit entrance plate 104. One end of each of optical fibers 116 is positioned adjacent to light source 118 while the other end is inserted into one of a plurality of retaining apertures 120 provided in the entrance plate 104. An entrance slit 121 is provided at each aperature 120 in a slit plate mounted on the inside surface of the plate 104 in the entrance focal plane.

Optical fibers 116 thus direct radiation from the source 118 to the mirror and dispersion grating 106 whereupon the radiation is separated into spectral bands or windows which are focused on the vidicon detector 122. OMA 113 is connected to a display device 115 such as an oscilloscope which provides a visual readout in the form of, for example, a plot of radiation intensity vs. wavelength to enable multielement analysis.

In accordance with this embodiment of the invention, the optical fiber polychromator includes entrance means for admitting light radiation into an entrance focal plane. As embodied herein, the entrance means, better shown in FIG. 8 includes the multi-slit entrance plate 104 including the optical fiber retaining apertures 120 and plate 105 providing entrance slits 121. In the Rowland Circle apparatus shown, plate 104 is positioned on the circumference of the cylindrical sidewall which defines the entrance focal plane for the apparatus. As is apparent from FIG. 8, light radiation from source 118 is admitted into the entrance focal plane via the slits 121 and is directed to the concave diffraction grating 106. The grating 106 separates the incident radiation into spectral components and focuses a spectral band covering a defined spectral window, e.g., 40 nm, onto the detector element 122. (The radius of the concave grating is equal to the diameter of the Rowland Circle).

In accordance with the invention, display means are located at a predetermined exit focal plane. As here embodied, and shown in FIGS. 7 and 8, display means includes detector target 122 located at exit focal plane 108 of the Rowland Circle apparatus. Detector target 122 is part of the vidicon detector 111 which is coupled to OMA 113. Referring to the end-most optical fibers 116A and 116D, radiation is directed from source 118 through the fibers and passes through entrance slits 121 provided in slit plate 105. The path of radiation is shown by dashed lines in FIG. 8 as $\mu_1-\mu_2$ and $\mu_3-\mu_4$. Radiation travels from the slits 121 to the concave diffraction grating 106 and is thereby focused as discrete spectral bands (not shown in FIG. 8) on detector target 122. The arrangement of spectral bands on detector target 122 is a significant feature of this embodiment of the invention and is described in greater detail below.

This embodiment further includes spectrum means for separating radiation into spectral components determined by the position at which the radiation is admitted into the entrance focal plane and for focusing the spectral components on the display means. As embodied herein and shown in FIGS. 7 and 8, the spectrum means includes the concave diffraction grating 106 which separates radiation incident upon surface 107 of the grating into spectral components. As described above, radiation directed by optical fibers 116A and 116D travels to dispersion grating 106 along paths $\mu_1-\mu_2$ and $\mu_3-\mu_4$. This radiation is separated into spectral components in accordance with the angle at which the radiation is incident upon the dispersion grating. It is apparent from following paths $\mu_1-\mu_2$ and $\mu_3\mu_4$ that the radiation directed by optical fibers 116A and 116D interacts with the dispersion grating 106 at different angles of incidence. (The relationship between grating grooves and incident and diffraction angles, $\alpha$ and $\beta$ correspondingly, obey the well known grating equation:

$$m\lambda = a(\sin \alpha \pm \sin \beta) \tag{3}$$

where a is the grooves spacing, $\lambda$ the wavelength and m the diffraction order).

Thus, the spectral components included in the radiation focused on the detector target 122 from fiber 116A will span a different range of wavelengths than the radiation focused on the target from the fiber 116D. Each spectral band will include a window of, for example, 40 nm within the overall spectral range of the system. Each of the fibers 116 shown in FIG. 8 thus accounts for a particular spectral window.

Still further in accordance with the invention, the optical fiber polychromator includes a plurality of optical fibers, each of the optical fibers having one end for positioning near a light source and the other end positioned adjacent to the entrance focal plane for guiding radiation to the focal plane. As embodied herein and shown in FIGS. 7 and 8, the optical fibers 116 are positioned near light source 118 to guide emitted radiation to the entrance focal plane which is coincident with slit plate 105. Optical fibers 116 can be moved to different positions around the light source to selectively gather particular radiation desired for analysis. Individual lenses 103 may be mounted on the ends (at the light source) of the optical fibers to enhance their light-collecting capacity. Also, spectral filters 117 may be inserted into the paths of the fibers to adjust the spectral content of the collected radiation if desired.

Figure 8:
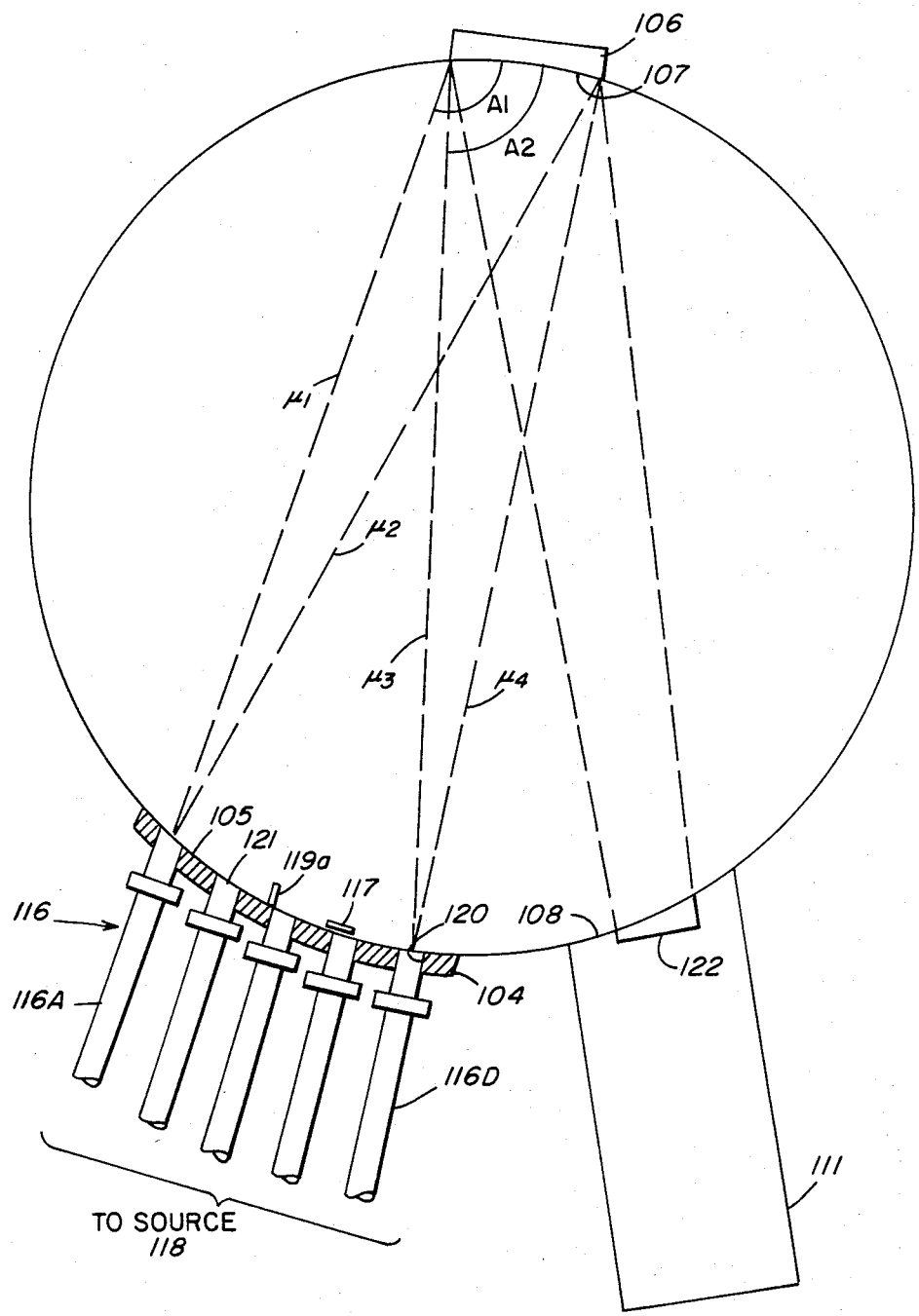
FIG. 8 is a plan view of the optical fiber polychromator shown in FIG. 7.

The other end of each optical fiber 116 is retained in entrance plate 104 adjacent to the entrance focal plane to direct radiation to that focal plane. As shown in FIG. 8, the optical fibers are inserted into apertures 120 of plate 104 adjacent to slit plate 105 which is coincident with the entrance focal plane. The slit plate 105 provides a slot 121 in alignment with each of the apertures 120.

Figure 9:
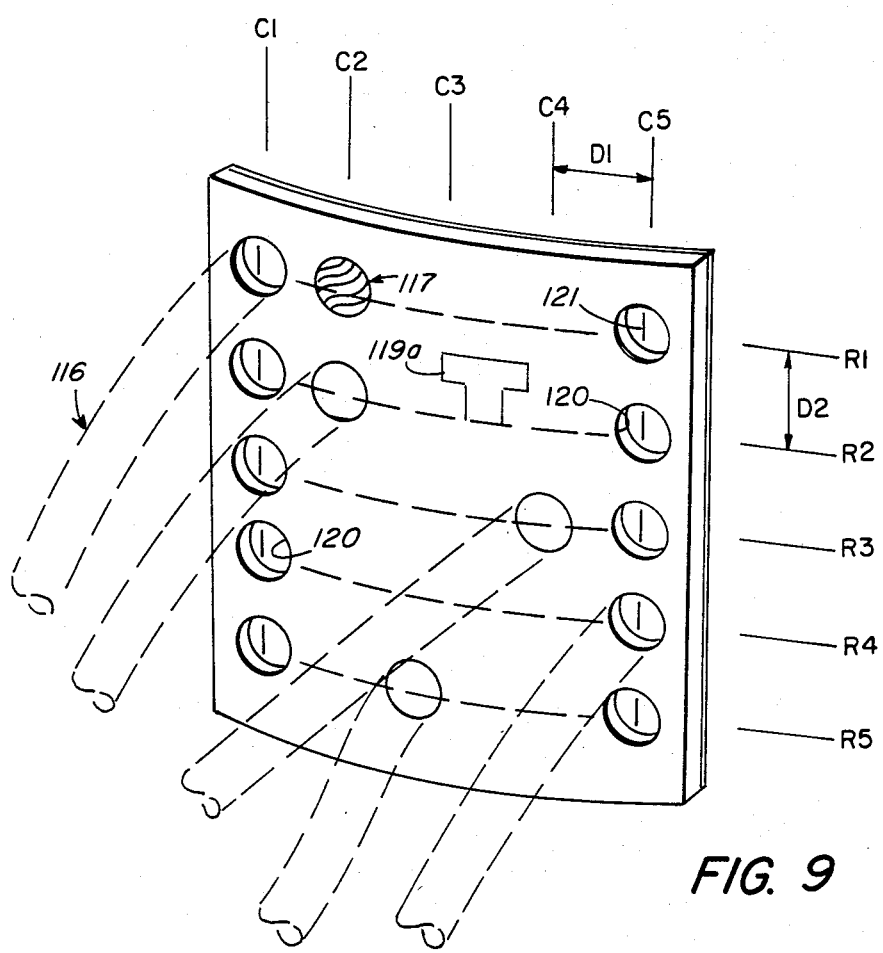
FIG. 9 is a schematic diagram illustrating the multi-slit entrance plate for retaining the optical fibers in the apparatus of FIGS. 7 and 8.

The optical fiber polychromator of the invention further comprises means included in the entrance means for retaining the end of each of the optical fibers nearest the entrance plane in any one of a plurality of locations in a predetermined array, each of the locations in the array being defined by column and row coordinates of a fixed rectilinear matrix located in the entrance focal plane, the column and row coordinates being separated by predetermined distances and the optical fibers being retained at locations of the array so that no two of the fibers are aligned with the same row or column coordinate, whereby radiation admitted by the fibers is displayed at the exit plane in parallel non-overlapping spectral bands. As embodied herein and shown in FIG. 9, the retaining means includes the apertures 120 in entrance plate 104. Each of the apertures occupies a particular location in a predetermined array defined by the row and column coordinates of a rectilinear matrix located in the focal plane. An aperture 120 and slit 121 are aligned with each R-C (row-column) coordinate point of the matrix. The column coordinates are separated by a predetermined distance D1 and row coordinates are separated by a predetermined distance D2. Behind each slit (inside spectrometer) it is possible to place either/or a spectral-filter 117 (FIGS. 8 and 9) or a lightshutter 119a (FIGS. 8 and 9). The spectral filter will exclude any unwanted radiation of wavelength not included in the corresponding band. The shutter will eliminate the light input (when necessary) from the corresponding optical fiber.

Figure 10:
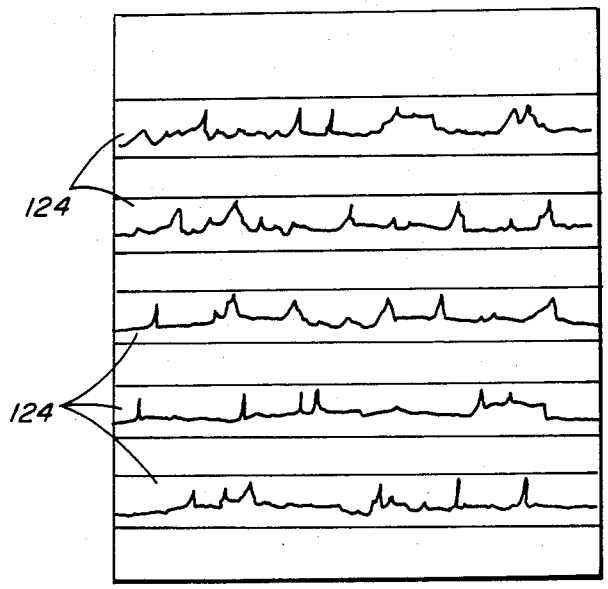
FIG. 10 is a schematic diagram illustrating the display of spectral bands or windows as produced by the arrangement of optical fibers shown in FIG. 9.

Referring to FIGS. 9 and 10, the relationship between the location of optical fibers 116 in entrance plate 104 and the display of spectral bands on detector target 122 can be understood. FIG. 10 is a schematic diagram showing the displayed spectral bands 124 (in a typical OMA display mode) corresponding to the five optical fibers 116 shown in FIG. 9. The bands are presented in a non-overlapping "stacked" configuration whereby the spectral information embodied in the bands can be interpreted simultaneously and without ambiguity or interference.

The top band 124 is produced by the radiation from the optical fiber located at the C3-R5 position in the entrance plate aperture array. The second band is produced by the C5-R4 fiber, the third band by the C4-R3 fiber, the fourth band by the C2-R2 fiber, and the bottom band by the C1-R1 fiber. The spectral window presented in each band depends on the column position occupied by the associated optical fiber. The reason the bands are displayed in the stacked, non-overlapping arrangement with discrete spectral windows as represented in FIG. 10 is that no two of the optical fibers are aligned with the same row or column coordinate. In other words, no column or row of the array has more than one optical fiber. If it is desired to have redundant spectral windows, such as to examine or compare different portions of the same source, more than one fiber can be placed in a single column, but in different rows to avoid overlapping displays as with the earlier described embodiment.

The center-to-center distance between the column coordinates in the aperture array (i.e., D1 in FIG. 9) should be made equal to the horizontal dimension of the detector target 122 in order to cover the full spectrum without leaving wavelengths. Thus, if a 10 mm.×10 mm. detector is used, the spacing between column coordinates should be 10 mm. The distance between row coordinates (i.e., D2 in FIG. 9) is selected in accordance with the number of tracks available on the detector target and the height of the entrance slits. Thus, if the entrance slits are 1 mm high, and it is desired to pack a large number of bands onto the detector target, the center-to-center distance between row coordinates should be set at approximately 1½ mm. This will allow ½ mm. vertical spacing between slits to avoid band interference and will permit full utilization of the capacity of the detector. The width of the slits is selected in accordance with the type of radiation to be analyzed and the spectral resolution sought. Typically, the slits will be between 10 μm. and 1 mm. in width.

The fibers 116 can be "plugged" into any combination of retaining apertures 120, like telephone jacks into a switchboard, to produce any desired ordered sequence of non-overlapping spectral bands, so long as no two fibers have the same row or column coordinate. A linear diagonal arrangement of fibers, such as is shown in FIG. 7 will produce vertically stacked, sequentially arranged spectral windows on the display. Unused apertures 120 should be closed by inserting an opaque plug so that unwanted radiation from the light source does not enter the optical chamber.

The parallel display of bands results in a highly efficient utilization of the vidicon detector 111 used to read out the bands and generate a corresponding oscilloscope display and/or to store in computer memory the spectra for further data processing. The representation of the bands shown in FIG. 10 represents an oscilloscope plot of radiation intensity vs. wavelength corresponding to the presentation of spectral bands on the detector target 122. Each spectral band on the detector is made up of a series of spectral lines representing the presence of certain wavelength components. Since the readout electron beam of the vidicon scans the target in a direction parallel to the bands, maximum utilization of the detector sensor array is achieved.

As further provided in accordance with the invention, the entrance means may include means for slidably retaining the entrance plane ends of the optical fibers for movement parallel to the entrance plane so that the fibers can be moved to different locations in the entrance array to adjust the positions of the parallel spectral bands and to select different spectral windows for display. In this embodiment the slidable retaining means, shown in FIG. 11, includes a slot 140 provided in entrance plate 104 in place of the apertures 120. The slot runs diagonally across the entrance focal plane from the top to the bottom thereof and functions as a guide track for the ends of the optical fibers 116 inserted therein. Two fibers 116 are shown, but additional ones may be provided, depending on the number of bands to be displayed.

A cover plate 142 retains the optical fibers in spaced relation and is slidably supported on the surface of entrance plate 104 by the brackets 144. In addition to functioning as a part of the slide assembly, the cover plate 142 prevents stray light from entering the optical chamber through the slot 140. In the embodiment shown in FIG. 11, the aperture means for providing the entrance slits comprises a slit plate affixed to the entrance plane end of each of the optical fibers. As specifically embodied, each slit plate 146 including an entrance slit 121 is mounted directly on the flat end of the fiber whereupon the slit moves with the fiber. With this arrangement it is possible to position the entrance slits at any of the row-column coordinate point locations along the axis of slot 140 and at any locations therebetween. This permits continuous selection of the spectral windows to be displayed.

Thus, the apparatus of this embodiment of the invention as herein described, constitutes a new type of polychromator which also may be described as a fiber optic vidicon spectrometer. The polychromator is specifically designed to operate with optoelectronic multichannel detectors and is a unit which is no larger in size than a conventional atomic absorption spectrometer. It offers the advantages of wide coverage and flexibility. Each entrance slit focuses a particular 40 nm. spectral region on the SIT vidicon target. Since the individual fiber optic bundles can be "plugged" into the retaining apertures in the entrance plate, any spectral window within the range of the apparatus may be selected for display. Those retaining apertures and slits not in use can be blocked with small opaque plugs. Further, an individual input lens may be employed at the end of each fiber optic strand to enhance collection of radiation from the source. Each individual lens, along with its fiber, may be positioned to observe the optimum region of the source in accordance with the desired elemental analysis.

The system enables simultaneous monitoring of spectra spanning a few hundred nm. with a spectral resolution better than 0.01 nm. By plugging the fiber optic strands into different retaining apertures, individual spectral lines can be moved to different desired positions on the detector target to exclude undesired flame bands. The stacked format in which the spectral bands are displayed is an extremely efficient match to the two-dimensional readout format of the silicon vidicon detector employed in the OMA. This allows the entire atomic spectral range of interest, typically 190 to 500 nm., to be simultaneously monitored with excellent resolution. Since the optics of the system are extremely simple, economical, and reliable operation is achieved.

While the invention has been particularly shown and described with reference to preferred embodiments thereof, it will be understood by those skilled in the art that the above and other changes in form and details may be made therein without departing from the spirit and scope of the invention.

What is claimed is:

1. An optical fiber polychromator comprising:
an optical arrangement including entrance means for admitting light radiation into an entrance focal plane, display means located at a predetermined exit focal plane, and spectrum means for separating said radiation into spectral components determined by the position at which said radiation is admitted into said entrance plane and for focusing said spectral components on said display means;
a plurality of optical fibers, each of said optical fibers having one end positioned near a light source and the other end positioned adjacent to said entrance focal plane for guiding radiation to said entrance plane; and means included in said entrance means for retaining the end of each of said optical fibers nearest said entrance plane in any one of a plurality of locations in a predetermined array, each of said locations in said array being defined by column and row coordinates in a fixed rectilinear matrix located in said entrance focal plane, said column and row coordinates being separated by predetermined distances and said optical fibers being retained at locations of said array so that no two of said fibers are aligned within the same row, whereby radiation admitted by said fibers is displayed at said exit plane in parallel non-overlapping spectral bands.

2. The optical fiber polychromator set forth in claim 1 further comprising:

means included in said entrance means for slidably retaining said entrance plane ends of said fibers for movement parallel to said plane so that said fibers can be moved to different locations in said array to adjust the positions of said parallel spectral bands and to select different spectral windows for display.

3. The optical fiber polychromator set forth in claim 2 wherein said slidable retaining means includes a track disposed adjacent to said entrance focal plane and running diagonally across said plane and means for mounting said optical fibers for movement along said track to permit the positioning of said fibers at said different array locations.

4. The optical fiber polychromator set forth in claim 1 wherein said entrance means includes aperature means providing an entrance slit for each optical fiber and wherein said spectrum means includes dispersion means for focusing a selected range of spectral components on said display means for each said entrance slit.

5. The optical fiber polychromator set forth in claim 4 wherein said dispersion means comprises a Rowland Circle apparatus having cylindrical sidewall means supporting said entrance means and said display means at adjacent positions thereon and including means for separating radiation into spectral components supported on said sidewall means at a position opposite said entrance and display means.

6. The optical fiber polychromator set forth in claim 4 wherein said aperture means comprises a slit plate affixed to said entrance plane end of each of said optical fibers.

7. An optical fiber polychromator according to claim 4 wherein said predetermined distance between said row coordinates depends on the height of said entrance slits.

8. The optical fiber polychromator set forth in claim 1 wherein said display means includes an area-array optoelectronic image detector having a target element located at said exit focal plane.

9. The optical fiber polychromator according to claim 8 in which said predetermined distance between said column coordinates is dependent upon the width of said detector target.

10. The optical fiber polychromator according to claim 9 in which said predetermined distance between said column coordinates is equal to the width of said detector target.

11. The optical fiber polychromator set forth in claim 1, wherein said display means includes an optical multichannel detector and data processing means.

12. The optical fiber polychromator set forth in claim 8, wherein said area-array optoelectronic image detector comprises at least one vidicon.

13. The optical fiber polychromator set forth in claim 1, wherein said display means includes a stack of linear photosensor arrays arranged in parallel, one above the other.

14. The optical fiber polychromator set forth in claim 13, wherein said linear photosensor arrays comprise photodiodes.

15. An optical fiber polychromator according to claim 1, including a plurality of spectral filters, with each of said filters being situated adjacent the end of one of said optical fibers nearest said entrance plane, said filters selectively excluding at least a portion of any radiation at wavelengths not included in the spectral band defined by the respective optical fiber.

16. An optical fiber polychromator according to claim 1, including a plurality of light shutters, with each of said shutters being situated adjacent the end of one of said optical fibers nearest said entrance plane for selectively stopping the light throughput of the respective optical fiber.

17. The optical fiber polychromator set forth in claim 16, wherein said light shutters comprise solenoid shutters.

18. The optical fiber polychromator set forth in claim 1, wherein the center-to-center distance between said column coordinates is equal to the horizontal dimension of said display means, and wherein said optical fibers are retained at locations of said array so that no two of said fibers are aligned within the same column.

19. A polychromator comprising:

an optical arrangement including entrance means for admitting light radiation into an entrance focal plane, display means located at a predetermined exit focal plane, and spectrum means for separating said radiation into spectral components determined by the position at which said radiation is admitted into said entrance plane and for focusing said spectral components on said display means;

light transmission means being adapted to transmit radiation from a light source to said entrance plane; and means included in said entrance means for retaining each of a plurality of portions of said light transmission means nearest said entrance plane in any one of a plurality of locations in a predetermined array, each of said locations in said array being defined by column and row coordinates in a fixed rectilinear matrix located in said entrance focal plane, said column and row coordinates being separated by predetermined distances, the said portions of said light transmission means being retained at locations of said array so that no two of said portions are aligned with the same row coordinate, whereby radiation admitted by said light transmission means is displayed at said exit plane in parallel non-overlapping spectral bands.

20. The polychromator set forth in claim 19, wherein the center-to-center distance between said column coordinates is equal to the horizontal dimension of said display means, and wherein said portions of said light transmission means are retained at locations of said array so that no two of said portions are aligned with the same column coordinate.

21. A polychromator according to claim 19, including lens means situated between said light source and said light transmission means for enhancing the light-collecting capacity of said light transmission means.

22. The polychromator set forth in claim 19, further comprising:
means included in said entrance means for slidably retaining said portions of said light transmission means for movement parallel to said entrance focal plane so that said portions can be moved to different locations in said array to adjust the positions of said parallel spectral bands and to select different spectral windows for display.

23. The polychromator set forth in claim 22, wherein said slidable retaining means includes a track disposed adjacent to said entrance focal plane and running diagonally across said plane, and means for mounting said portions of said light transmission means for movement along said track to permit the positioning of said portions at said different array locations.

24. The polychromator set forth in claim 19, wherein said entrance means includes aperture means providing an entrance slit for each of said portions of said light transmission means, and wherein said spectrum means includes dispersion means for focusing a selected range of spectral components on said display means for each said entrance slit.

25. The polychromator set forth in claim 24, wherein said dispersion means comprises a Rowland Circle apparatus having cylindrical sidewall means supporting said entrance means and said display means at adjacent positions thereon, and including means for separating radiation into spectral components supported on said sidewall means at a position opposite said entrance and display means.

26. The polychromator set forth in claim 24, wherein said aperture means comprises a slit plate affixed to said portions of said light transmission means.

27. A polychromator according to claim 19, including a plurality of spectral filters, with each of said filters being situated adjacent one of said portions of said light transmission means, said filters selectively excluding at least a portion of any radiation at wavelengths not included in the spectral band defined by the respective portion.

28. A polychromator according to claim 19, including a plurality of light shutters, with each of said shutters being situated adjacent one of said portions of said light transmission means for selectively stopping the light throughput of the respective portion.

29. A device for admitting light radiation into the entrance focal plane of a polychromator having means for transmitting radiation from a light source to said entrance plane, comprising a plate having means for retaining each of a plurality of portions of said light transmission means in any one of a plurality of locations in a predetermined array, each of said locations in said array being defined by column and row coordinates in a fixed rectilinear matrix located in said entrance plane, said column and row coordinates being separated by predetermined distances.

30. The device set forth in claim 29, further comprising means for slidably retaining said portions of said light transmission means for movement parallel to said entrance plane so that said portions can be moved to different locations in said array.

31. The device set forth in claim 30, wherein said slidable retaining means includes a track disposed adjacent to said entrance plane and running diagonally across said different array locations.

32. The device set forth in claim 29, further comprising aperture means providing an entrance slit for each of said portions of said light transmission means.

33. The device set forth in claim 32, wherein said aperture means comprises a slit plate affixed to said portions of said light transmission means.

34. The device set forth in claim 29, further comprising spectral filter means situated adjacent said portions of said light transmission means, said filter means selectively excluding at least a portion of any radiation at wavelengths not included in the spectral band defined by the respective portion.

35. The device set forth in claim 29, further comprising light shutter means situated adjacent said portions of said light transmission means for selectively stopping the light throughput of the respective portion.

* * * * *